J. D. SARVEN.
Carriage Spring.
No. 74,010.
Patented Feb. 4, 1868.
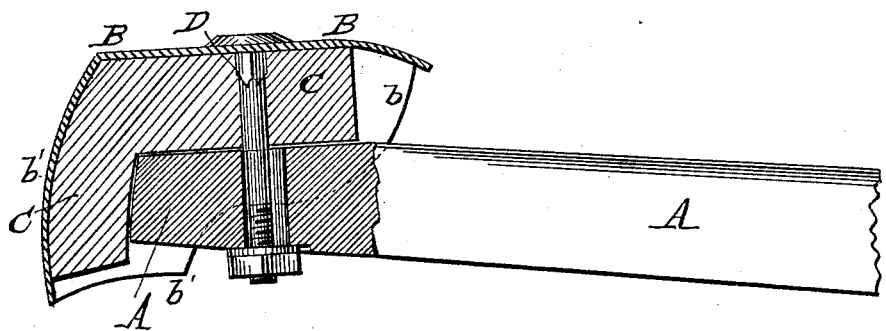

UNITED STATES PATENT OFFICE.

JAMES D. SARVEN, OF COLUMBIA, TENNESSEE.

IMPROVEMENT IN CARRIAGE-SPRINGS.

Specification forming part of Letters Patent No. 74,010, dated February 4, 1868.

*To all whom it may concern:*

Be it known that I, JAMES D. SARVEN, of Columbia, in the county of Maury and State of Tennessee, have invented a new and useful Improvement in Carriage-Springs; and I do hereby declare that the following is a full, clear, and exact description thereof, which will enable others skilled in the art to make and use the same, reference being had to the accompanying drawings, forming part of this specification.

The figure is a side view, partly in section, of the end of a wooden spring with my improvement attached.

My invention has for its object to so improve the construction of X-shaped carriage-springs as to allow them to have greater freedom of motion when in use, and at the same time to prevent any jar or concussion when in use; and it consists in the combination of the metallic plate or cap, having flanges upon its sides and outer end, and the rubber spring or angular block, with the end of the wooden spring, in the manner hereinafter more fully described.

A represents the upper end of one of the bars of an X-shaped wooden spring, with which the body of the carriage is connected, either directly or by the interposition of curved metallic or other springs. B is a metallic plate, having flanges $b'$ upon its sides, which overlap the sides of the end of the spring A. The flanges $b'$ are continued around the outer end of the plate B, as shown in the drawing, thus forming a cap for the end of the spring. C is a rubber spring or angular block, fitting into the cap B upon the top of the end of the spring A, and extending down between the end of said spring A and the end flange of the plate or cap B, as shown in the figure. D is the bolt by which the body of the carriage is secured to the end of the spring A, and which also passes through the cap or plate B, and through the rubber spring C, securing said cap and spring in their proper relative positions. The ends of the springs A, through which the bolt D passes, are slotted, as shown in the figure, so that when the upper ends of the X-shaped springs are forced farther apart by the application of weight or pressure, the said springs may move freely upon the bolt D, the part of the rubber spring C that passes around the end of said spring A preventing any sudden jar or concussion from the end of the spring A being brought up or checked suddenly.

It should be observed that when the part of the rubber block or spring C upon the upper side of the end of the spring A is compressed by the action of weight or pressure, the bolt D may be kept tight by means of an elastic washer placed beneath the nut that secures the said bolt in place.

I claim as new and desire to secure by Letters Patent—

The combination of the metallic plate or cap B, having flanges $b'$ upon its sides and outer end, and the rubber spring or angular block C, with the end of the wooden spring A, substantially as herein shown and described, and for the purpose set forth.

JAMES D. SARVEN.

Witnesses:
W. S. RAINEY,
JOE H. FUSSELL.